United States Patent Office 2,928,736
Patented Mar. 15, 1960

2,928,736

PRODUCTION OF HIGH WET STRENGTH PAPER

Thomas M. Laakso and William F. Fowler, Jr., Rochester, N.Y., assignors to Eastman Kodak Company, Rochester, N.Y., a corporation of New Jersey No Drawing. Application July 7, 1955
Serial No. 520,611

1 Claim. (Cl. 96—85)

This invention concerns a method for imparting high wet strength to paper.

Photographic papers for the most part must be capable of withstanding a certain amount of handling while wet due to the requirement that the sensitized coating must be processed in photographic solutions. Consequently, various agents are added to the paper pulp from which photographic paper is made in order to add to the wet strength of the finished photographic paper. Some of these photographic papers have incorporated cationic urea-formaldehyde or melamine-formaldehyde condensates. The wet strength values imparted to the paper using these condensates are sufficiently high, but it has been found in certain applications that it would be preferable to have a smaller amount of formaldehyde present.

We have discovered a new group of resin intermediates as wet strengtheners for photographic paper which only require the use of very small relative amounts of formaldehyde. These are polyaminotriazole-formaldehyde intermediate resin condensates.

One object of this invention is to provide a photographic paper having high wet strength. Another object of this invention is to provide a formaldehyde-condensate for imparting high wet strength to paper in which a relatively small amount of formaldehyde is used. A further object of this invention is to provide a photographic paper having high wet strength which serves as a suitable support for commercially available tub sizes.

The above objects are obtained by condensing hydrazine with a dibasic acid or ester thereof to produce the corresponding dihydrazide:

$$2H_2N—NH_2 + HOOC—R—COOH$$
$$\rightarrow H_2N—NH—CO—R—CO—NH—NH_2 + 2H_2O$$

R is $(CH_2)_n$ in which $n$ may be from 0 to 8.

A dihydrazide is then heated in the presence of a small amount of aqueous hydrazine to produce a condensation polymer containing as the recurring linkage a 4-amino-1.2.4-triazole ring:

$$n(H_2N—NH—CO—R—CO—NH—NH_2) \longrightarrow H_2N—NH—CO—\left[ R—C\underset{N——N}{\overset{\underset{|}{N}\overset{NH_2}{\underset{}{}}}{\diagup\diagdown}} C— \right] R—CO—NH—NH_2 + 2(n-1)H_2O$$

This product, known as polyaminotriazole, is then dissolved in dilute aqueous mineral acid solution and, shortly prior to use, treated with a quantity of formaldehyde sufficient only to react with the primary amino groups.

The preparation of the polyaminotriazoles is described in greater detail by J. W. Fisher in an article "Polyaminotriazoles As Fiber-Forming Materials," published in the "Journal of Applied Chemistry," vol. 4, part 4, April 1954, pages 212–219. The following examples illustrate our invention but are not intended to limit its scope.

EXAMPLE I-A

*Preparation of butane-1,4-dicarbohydrazide*

Two thousand eighty-eight grams (12 moles) of methyl adipate, 1200 ml. (24 moles) of hydrazine hydrate (64 percent) and 2500 ml. of methanol were refluxed overnight on a steam bath. After cooling to room temperature, the crystalline product was filtered by suction, washed well with methanol, and dried.

The yield of snow-white crystals of butane-1,4-dicarbohydrazide, M.P. 181–182° C., was 95 percent of the theoretical value.

EXAMPLE I-B

*Preparation of Polytetramethylene-4-aminotriazole*

Six hundred and twenty grams of butane-1,4-dicarbohydrazide and 50 ml. of hydrazine hydrate (64 percent) were heated in an autoclave for one hour at 220° C. The pressure was then released to 200 pounds per square inch. The temperature was maintained at 220° but at regular intervals the pressure was released to 200 pounds per square inch over a period of about 3 hours.

The product was a white solid having an intrinsic viscosity of 0.32 in phenol-tetrachloroethane and a melting point of 315° C.

EXAMPLE I-C

*Preparation of polytetramethylene-4-aminotriazole-formaldehyde intermediate resin acid solution*

One hundred grams of polytetramethylene-4-aminotriazole powder was dissolved in 0.5040 normal hydrochloric acid. This solution was filtered to remove a small amount of acid-insoluble material. One hundred milliliters of this solution was rapidly agitated mechanically while 1.2 ml. of 18–20 percent aqueous formaldehyde solution was added. A sharp rise in viscosity of the mix was observed within one hour's standing at room temperature, after which time the resin intermediate solution was incorporated into the paper-making pulp slurry.

EXAMPLE II-A

*Preparation of octane-1,8-dicarbohydrazide*

Five hundred grams (2.2 moles) of methyl sebacate, 220 ml. (4.4 moles) of hydrazine hydrate (64 percent) and 500 ml. of methanol were refluxed overnight on a steam bath. After cooling to room temperature, the crystalline product was filtered by suction, washed well with methanol, and dried.

The yield of snow-white crystals of octane-1,8-dicarbohydrazide, M.P. 184–185° C., was 95 percent of the theoretical value.

EXAMPLE II-B

*Preparation of polyoctamethylene-4-aminotriazole*

Seven hundred and five grams of octane-1,8-dicarbohydrazide and 80 ml. of hydrazine hydrate (64 percent) were heated in an autoclave for one hour at 220° C. The pressure was then released to 200 pounds per square inch. The temperature was maintained at 220° C. but at regular intervals the pressure was released to 200 pounds per square inch over a period of about 3 hours.

The product was a white solid having an intrinsic viscosity of 0.3 to 0.4 in phenol-tetrachloroethane.

EXAMPLE II-C

*Preparation of polyoctamethylene-4-aminotriazole-formaldehyde intermediate resin acid solution*

One hundred grams of polyoctamethylene-4-aminotriazole powder was dissolved in 1050 ml. of 0.66 normal hydrochloric acid. The remainder of the procedure with this solution was identical with that given the corresponding solution of Example I-C.

EXAMPLE III

*Preparation of paper*

To each of twelve different samples of six liters of Jordanned water leaf paper slurry containing 2.25 percent pulp were added the chemicals listed in the order added. The mixtures were each stirred mechanically for a few minutes and made into hand sheets weighing 5 grams per sheet on a Noble and Wood hand sheet machine. Drying was for 5 minutes at 210–220° F. The various chemicals which were added to the sample are listed in the table which follows, together with observed pH values after each addition.

TABLE I.—CHEMICALS ADDED TO 6 LITERS OF 2.25% PULP SLURRY

| No. | Initial pH | Amt. Sizing, ml. | Amt. AlCl₃, ml. | Amt. and Type, Wet Strengthener | Final pH |
|---|---|---|---|---|---|
| N-81 | 7.35 | None | None | None | 7.35 |
| N-82 | 7.25 | None | None | 36 ml. 7% mel.-CH₂O | 5.70 |
| N-83 | 7.40 | None | None | 30 ml. 10% PAT-4-CH₂O | 4.00 |
| N-84 | 7.40 | None | None | 30 ml. 10% PAT-8-CH₂O | 3.05 |
| N-85 | 7.40 | None | 11.5 | None | 4.55 |
| N-86 | 7.40 | None | 7.0 | 36 ml. 7% mel.-CH₂O | 4.50 |
| N-87 | 7.40 | None | 11.5 | 30 ml. 10% PAT-4-CH₂O | 3.30 |
| N-88 | 7.40 | None | 11.5 | 30 ml. 10% PAT-8-CH₂O | 2.85 |
| N-89 | 7.40 | 141 | 28.0 | None | 4.50 |
| N-90 | 7.40 | 141 | 28.0 | 36 ml. 7% mel.-CH₂O | 4.55 |
| N-91 | 7.40 | 141 | 28.0 | 30 ml. 10% PAT-4-CH₂O | 4.55 |
| N-92 | 7.40 | 141 | 28.0 | 30 ml. 10% PAT-8-CH₂O | 4.55 |

NOTE.—Identification in detail of chemicals is as follows:

"Sizing"=A solution containing 1.9 percent stearic acid plus 2.2 times the stoichiometric amount of an alkali metal hydroxide.
"AlCl₃"=A 16 percent aqueous solution of AlCl₃.
"Mel.-CH₂O"=Commercial melamine-formaldehyde (essentially trimethylol-melamine) dissolved in dilute hydrochloric acid.
"PAT-4-CH₂O"=Polyaminotriazole-formaldehyde resin intermediate solution prepared as in Example I, Part C.
"PAT-8-CH₂O"=Polyaminotriazole-formaldehyde resin intermediate solution prepared as in Example II, Part C.

EXAMPLE IV

*Testing of the paper*

Each of the sets of hand sheets whose preparation is described in Example III was tested for wet strength and Valley penetration. Results are tabulated below.

TABLE II.—PHYSICAL TEST RESULTS

| No. | Chemicals Added to Pulp | Wet Strength [1] | Valley Penetration [1] |
|---|---|---|---|
| N-81 | None | Nil | Nil |
| N-82 | Mel.-CH₂O only | 7.75 | Nil |
| N-83 | PAT-4-CH₂O only | 4.75 | Nil |
| N-84 | PAT-8-CH₂O only | 2.50– | Nil |
| N-85 | AlCl₃ only | 1.00 | Nil |
| N-86 | AlCl₃+Mel.-CH₂O | 8.75 | Nil |
| N-87 | AlCl₃+PAT-4-CH₂O | 10.25 | Nil |
| N-88 | AlCl₃+PAT-8-CH₂O | 4.25 | Nil |
| N-89 | Stearate size+AlCl₃ | 1.50 | 932 |
| N-90 | Stearate size+AlCl₃+Mel.-CH₂O | 6.50 | >2,000 |
| N-91 | Stearate size+AlCl₃+PAT-4-CH₂O | 3.25 | 1,488 |
| N-92 | Stearate size+AlCl₃+PAT-8-CH₂O | 3.00 | 1,796 |

[1] Average of 5 measurements in all cases.

It may be seen from an examination of Table II that polyaminotriazole-formaldehyde intermediates, when added to a pulp slurry, will very greatly increase the wet strength of Jordanned water leaf stock. These resin intermediates are most effective when used in the presence of aluminum chloride, but produce a very large increase in wet strength when used either alone or in conjunction with sodium stearate (as a sizing agent) and aluminum chloride. In addition to the examples shown above, other dibasic acids (or their esters) such as oxalic, malonic, succinic, glutaric, pimelic, suberic, azelaic, and the "dimerized" fatty acids may be employed. The sizing operation, instead of taking place in the pulp slurry, may be done as a tubbing operation subsequent to sheet formation and initial drying on the paper machine. Tub sizes such as Hercules' Aquapel 380, du Pont's "Quilon," Dow-Corning's "Silicones" and others may be used after beater sizing with these polyaminotriazole-formaldehyde condensates. It will be noted from the examples that in preparing the polyaminotriazole-formaldehyde resin intermediate solutions that only 2.4 percent of the weight of the resin is formaldehyde as compared with that incorporated into the sheet when trimethylol-melamine condensate is used of about 41.7 percent formaldehyde.

Paper prepared according to our invention is compatible with photographic emulsions containing light sensitive silver halide salts such as silver bromide, silver chloride and the like.

Paper prepared according to Example I in which a polyaminotriazole was incorporated in the paper pulp was directly sensitized with a washed silver bromide photographic emulsion. The sensitized paper was tested for quality, surface, emulsion, frill, and sensitometric reproducibility. The results were found to be acceptable. There was no evidence of intensification or desensitization of the emulsion.

The Valley Penetration test recorded in seconds was measured as follows: The Valley Penetration test consists of mounting a two-inch square of paper to be tested between two wooden blocks that have been drilled to allow an electrolyte (516 ml. distilled water, 24 g. of NaCl, 60 ml. glycerine) to contact both sides of the paper simultaneously over a circular area of approximately one inch diameter. A potential is applied that allows 200 ma. of current to flow when no paper sample is present. When a paper sample is mounted in the blocks, the time in seconds is noted from the moment the electrolyte is first brought in contact with the paper sample until 160 milliamps. of current flows through the paper sample.

The paper was tested for wet strength by a two hour immersion in distilled water at room temperature followed by measuring the bursting strength in a Minden paper tester in pounds per square inch.

We claim:

A paper having a heater sizing including approximately 2% (based on the bone-dry weight of the pulp) of a polyaminotriazole-formaldehyde condensate prepared by heating a dihydrazide having the formula $$H_2N-NH-CO-(CH_2)_nCO-NH-NH_2$$

in which $n$ may be between 0 and 8 with hydrazine to form a polyaminotriazole and condensing with formaldehyde sufficient only to react with the primary amino groups and a photographic light sensitive silver halide coating applied on said sized paper, said sizing imparting high wet strength to the paper and being chemically inactive to deteriorate the light sensitive chemicals of said coating.

References Cited in the file of this patent

UNITED STATES PATENTS

| 1,370,650 | Hoskins | Mar. 8, 1921 |
| 2,384,369 | D'Alelio | Sept. 4, 1945 |
| 2,394,289 | Boughton | Feb. 5, 1946 |
| 2,447,064 | Gebhart | Aug. 17, 1948 |
| 2,626,214 | Osborne | Jan. 20, 1953 |
| 2,665,261 | Baker | Jan. 5, 1954 |
| 2,689,228 | Thomas | Sept. 14, 1954 |
| 2,794,737 | Lundberg | June 4, 1957 |

OTHER REFERENCES

Fisher: "Polyaminotriazoles as Fiber-Forming Materials," published in the "Journal of Applied Chemistry," volume 4, part 4, April 1954, pages 212–219.